US008279916B2

(12) United States Patent
Khayrallah

(10) Patent No.: US 8,279,916 B2
(45) Date of Patent: *Oct. 2, 2012

(54) EQUALIZATION USING SERIAL LOCALIZATION WITH INDECISION

(75) Inventor: Ali S. Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 542 days.

This patent is subject to a terminal disclaimer.

(21) Appl. No.: 12/549,143

(22) Filed: Aug. 27, 2009

(65) Prior Publication Data

US 2011/0051795 A1 Mar. 3, 2011

(51) Int. Cl.
*H04L 27/01* (2006.01)
(52) U.S. Cl. ........................ 375/232; 375/341
(58) Field of Classification Search ............ 375/232, 375/229, 230, 350, 262, 340, 341, 320
See application file for complete search history.

(56) References Cited

U.S. PATENT DOCUMENTS

| 2003/0063596 | A1* | 4/2003 | Arslan et al. | 370/347 |
|---|---|---|---|---|
| 2004/0052317 | A1 | 3/2004 | Love et al. | |
| 2005/0243943 | A1* | 11/2005 | Stirling-Gallacher | 375/267 |
| 2006/0251181 | A1* | 11/2006 | Shashidhar et al. | 375/262 |
| 2008/0198952 | A1* | 8/2008 | Stirling-Gallacher | 375/340 |
| 2008/0310556 | A1* | 12/2008 | Lee et al. | 375/340 |

FOREIGN PATENT DOCUMENTS

EP 1 718 019 A1 11/2006

OTHER PUBLICATIONS

Qingmin Meng, Yu Chen, Xiaohu You and Xiangyang Zhuang, "Transmit Antenna Selection in Spatial Correlated MIMO Systems with Correlation-Adapted Iterative Receiver", Southeast University, Nanjing, China and Motorola, 2006 IEEE.*
Xiaodong Li, Howard C. Huang, Angel Lozano and Gerard J. Foschini, "Reduced-complexity detection algorithms for systems using multi-element arrays", Lucent Technologies, Bell Labs, 2000 IEEE.*
Meng Qingmin, Hua Jingyu, You Xiaohu and Zhuang Xiangyang, "Combined Transmit Antenna Selection and Detection over Spatial Correlated MIMO Systems", Journal of Electronics, Nov. 2007.*
Ananya Sen Gupta and Andrew C. Singer, "Multi-stage Detection Using Constellation Structure", University of Illinois at Urbana-Champaign, IEEE, Nov. 2006.*

* cited by examiner

*Primary Examiner* — Aristocratis Fotakis

(57) ABSTRACT

A receiver includes a constellation processing module and a plurality of equalization stages. The constellation processing module groups points of a constellation associated with a transmitted signal into a plurality of subsets. At least two adjacent ones of the subsets have one or more common constellation points so that the at least two adjacent subsets overlap. The constellation processing module also determines a centroid-based value for each of the subsets of constellation points and groups the centroid-based values into one or more sets. Each of the equalization stages except for a the last equalization stage localizes a search for a final symbol decision using the set of centroid-based values input to or selected by the equalization stage as constellation points. The last equalization stage determines the final symbol decision using the subset of constellation points input to or selected by the last equalization stage.

12 Claims, 11 Drawing Sheets

EQUALIZATION USING SERIAL LOCALIZATION WITH INDECISION

TECHNICAL FIELD

The present invention generally relates to equalization, and more particularly relates to equalization based on serial localization with indecision.

BACKGROUND

MLSE (Maximum Likelihood Sequence Estimation) is a demodulation technique that also suppresses ISI (Inter-Symbol Interference) from a signal which is modulated in accordance with a particular constellation and transmitted over a channel. ISI causes the equalization complexity to increase as a power of the constellation size. Relatively large signal constellations such as 16-, 32- and 64-QAM (Quadrature Amplitude Modulation) have been adopted in EDGE (Enhanced Data Rates for GSM Evolution), HSPA (High Speed Packet Access), LTE (Long Term Evolution) and WiMax (Worldwide Interoperability for Microwave Access). In HSPA, multi-code transmission creates even larger effective constellations. Also, MIMO (Multiple-Input, Multiple-Output) schemes with two or more streams have been adopted in HSPA, LTE and WiMax. MIMO implementations also yield relatively large effective constellations. ISI causes equalization complexity to further increase when any of these techniques occur in combination, e.g. multi-code and MIMO.

In the ISI context, the ideal equalization scheme is MLSE, in the sense of maximizing the probability of correctly detecting the transmitted sequence of symbols, or sequences of symbols in the MIMO case. However, the complexity of MLSE increases substantially as a function of the size of the modulation constellation and/or because of the exponential effects of MIMO or multi-codes to the point where MLSE becomes impractical. Less complex solutions are available such as, DFSE (Decision-Feedback Sequence Estimation), DFE (Decision-Feedback Equalization), etc. Each of these solutions attempts to strike a balance between accuracy and complexity.

For a symbol-spaced channel model with memory M in a MIMO environment, the system model is given by:

$$r_k = H_M s_{k-M} + \ldots + H_1 s_{k-1} + H_0 s_k + V_k \quad (1)$$

Here the element $H_{m,\,i,\,j}$ of $H_m$ describes the channel from transmit antenna j to receive antenna i at a delay of m symbols. The channel matrices are assumed to be constant over the duration of a burst of data, which will be equalized in one shot. The signal $s_k$ has symbol constellation Q of size q. The noise $v_k$ is white and Gaussian.

The general ISI scenario includes MIMO. Without much loss of generality, consider the case of a single transmitted signal. For a channel with memory M, MLSE operates on the standard highly regular ISI trellis with $q^M$ states, and $q^{M+1}$ branches per stage. The storage complexity of MLSE is roughly driven by the number of states, and the computational complexity by the number of branches. As either M or q grows large, the complexity explodes. Stage k of the trellis describes the progression from state $(\hat{s}_{k-M} \ldots \hat{s}_{k-1})$ to state $(\hat{s}_{k-M+1} \ldots \hat{s}_k)$. The branch from $(\hat{s}_{k-M} \ldots \hat{s}_{k-1})$ to $(\hat{s}_{k-M+1} \ldots \hat{s}_k)$ represents the symbol $\hat{s}_k$. Note that for the ISI trellis, all branches ending in $(\hat{s}_{k-M+1} \ldots \hat{s}_k)$ share the same symbol. For notational simplicity, the states at each stage are labeled 0 to $q^M - 1$. Each index represents a distinct value of $(\hat{s}_{k-M+1} \ldots \hat{s}_k)$. A branch is labeled by its starting and ending state pair (j',j). For each state j, the fan-in I(j) and the fan-out O(j) are the set of incoming and outgoing branches, respectively. For the ISI trellis, all fan-in and fan-out sets have the same size q.

The branch metric of a branch (j',j) at step k in the MLSE trellis is given by:

$$e_k(j',j) = |r_k - H_M \hat{s}_{k-M} + \ldots + H_0 \hat{s}_k|^2 \quad (2)$$

Without much loss of generality, the trellis is assumed to start at time 0 in state 0. The state metric computation proceeds forward from there. At time k, the state, or cumulative, metric $E_k(j)$ of state j is given in terms of the state metrics at time k−1, and the branch metrics at time k is given by:

$$E_k(j) = \min_{j' \in I(j)} (E_{k-1}(j') + e_k(j',j)) \quad (3)$$

In addition, the state in I(j) that achieves the minimum is the so-called predecessor of state j, and denoted $\pi_{k-1}(j)$. Also, the oldest symbol $\hat{s}_{k-M}$ in the corresponding M-tuple $(\hat{s}_{k-M}, \ldots, \hat{s}_{k-1})$ is the tentative symbol decision looking back from state j at time k. It is possible to trace back a sequence over the different states to time 0, by following the chain $\pi_{k-1}(j)$, $\pi_{k-2}(\pi_{k-1}(j))$, etc. The corresponding symbols $\hat{s}_{k-M}$, $\hat{s}_{k-M-1}$, etc, are the tentative decisions of MLSE looking back from state j at time k. In general, looking back from different states at time k, the decisions tend to agree more the older the symbols. That is, the longer the delay for a decision, the better. Typically, there is a chosen delay D, and the final decision about symbol $\hat{s}_{k-M-D}$ is made by tracing back from the state $(\hat{s}_{k-M+1} \ldots \hat{s}_k)$ with the smallest state metric. We note again, however, that MLSE has exploding complexity, whether due to the size of the modulation itself, or to the exponential effect of ISI.

Another conventional equalization technique is MSA (Multi-Stage Arbitration). MSA involves sifting through a large set of candidates in multiple stages, where each stage rejects some candidates until a single candidate is left after the final stage. One specific example of MSA is generalized MLSE arbitration where the first stage is a linear equalizer. The second stage implements MLSE based on a sparse irregular trellis over a reduced state space. Iterative Tree Search (ITS) has also been used for performing equalization in MIMO QAM environments. ITS exploits the triangular factorization of the channel. In addition, ITS uses the M-algorithm for reducing the search for the best candidate. ITS breaks down the search further, by dividing the QAM constellation in its four quadrants, and representing each quadrant by its centroid in intermediate computations. The selected quadrant itself is subdivided again into its 4 quadrants, and so on. This results in a quaternary tree search. Other conventional approaches give particular attention to the additional error introduced by the use of centroids instead of true symbols. The error is modeled as Gaussian noise whose variance is determined and incorporated in likelihood computations. However, a tight connection is typically made between the centroid representation and the bit mapping from bits to symbols. That is, if a so-called multi-level bit mapping is employed, then identifying a quadrant is equivalent to making a decision on a certain pair of bits. Such constraints place a restriction on bit mappings, restricting the design of subsets.

SUMMARY

Equalization is performed in a series of stages for suppressing ISI. Each stage attempts to further localize the search for a solution for the benefit of the next stage, based on input from the previous stage. The equalization structure is generally referred to herein as serial localization with indecision (SLI).

SLI is a lower complexity alternative to MLSE in the ISI scenario. Viewed in isolation, a given SLI equalization stage can be quite indecisive, but makes progress and avoids an irreversible wrong decision. A given equalization stage localizes the solution by inputting a subset representative of the constellation and outputting a further reduced subset. Each stage makes a choice among candidate reduced subsets. Indecision arises from representing the modulation constellation with overlapping subsets. Indecision is beneficial in a multi-stage structure, because indecision discourages an irreversible bad decision in an early stage.

According to an embodiment of a method for equalizing inter-symbol interference (ISI) in a received signal corresponding to a transmitted signal carried over a channel, the method includes grouping points of a constellation associated with a transmitted signal into a plurality of subsets. At least two adjacent ones of the subsets have one or more common constellation points so that the at least two adjacent subsets overlap. A centroid-based value is determined for each of the subsets of constellation points and the centroid-based values are grouped into one or more sets for input to an equalizer having a plurality of stage. An equalizer is used to equalize the ISI. Each stage of the equalizer except for the last stage localizes the search for a final symbol decision using the set of centroid-based values input to or selected by the stage as constellation points. The last equalization stage determines the final symbol decision using the subset of constellation points input to or selected by the last stage.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
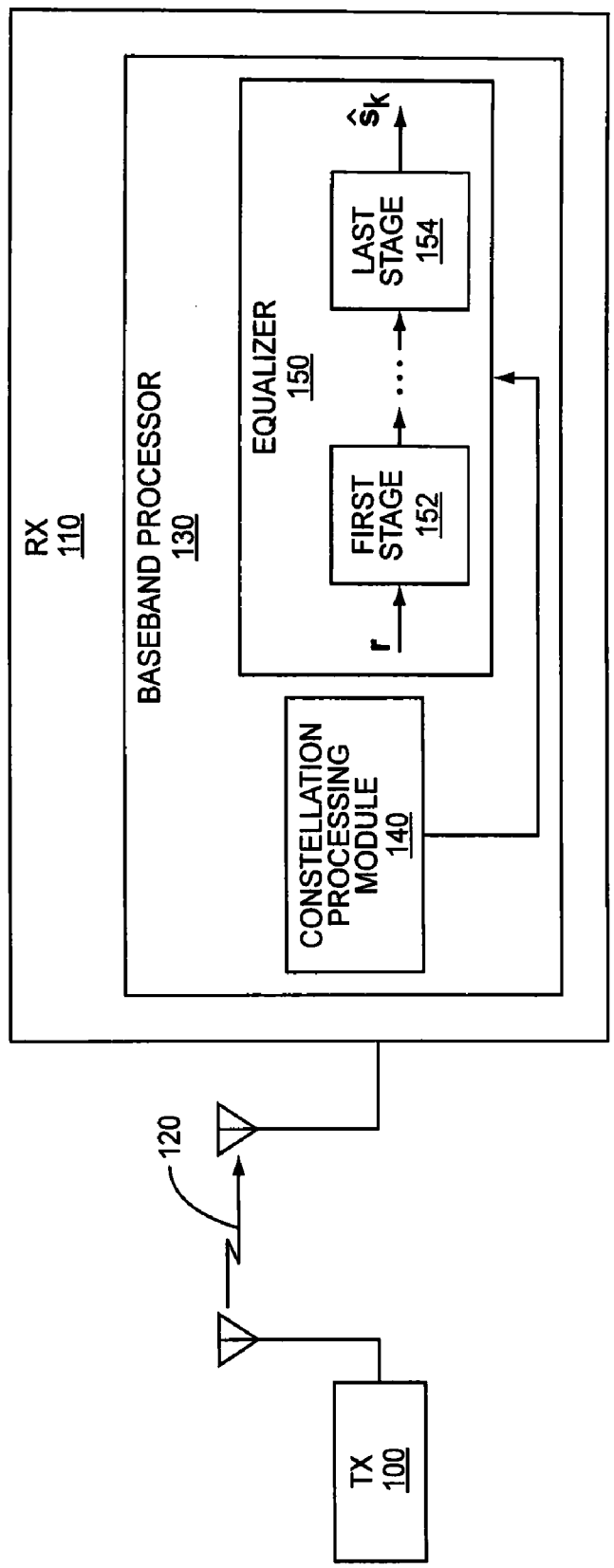
FIG. 1 illustrates a block diagram of an embodiment of a receiver including a multi-stage SLI equalizer and a constellation processing module.

FIG. 1 illustrates an embodiment of a wireless transmitter 100 in communication with a wireless receiver 110 over a channel 120. The receiver includes a baseband processor 130 and a constellation processing module 140 and a multi-stage SLI equalizer 150 included in or associated with the baseband processor 130. The constellation processing module 140 groups points of a constellation associated with a transmitted signal into a plurality of subsets, e.g., subsets of ASK constellation points, QAM constellation points, etc. At least two adjacent subsets have one or more common constellation points to ensure overlap. In some embodiments, all adjacent subsets have one or more common constellation points to ensure that all adjacent subsets overlap. In each case, the constellation processing module 140 also determines a centroid-based value for each of the subsets of constellation points and groups the centroid-based values into one or more sets. The values included in each set are centroid-based in that they may be actual centroids, approximations of centroids such as integer values or values quantized to a certain finite precision, the closest constellation point to a centroid, etc. More generally, each subset is assigned a representative, which we call a centroid from here on.

The multi-stage SLI equalizer 150 includes a plurality of stages 152, 154 for suppressing ISI and demodulating a received signal. Each of the equalization stages 152 except for the last stage 154 localizes the search for a final sequence decision using the set of centroid-based values input to or selected by the stage 152 as constellation points. The last equalization stage 154 finalizes the decision using a subset of the initial constellation points. This way, each of the equalization stages 152 except for the last stage 154 further localizes the search for a solution using a set of the centroid-based values as constellation points, reducing the overall complexity of the equalizer. The last stage 154 outputs the final solution based on a subset of the actual constellation. The constellation processing module 140 ensures that at least two adjacent subsets of constellation points overlap to reduce the likelihood of demodulation errors, particularly for the earlier equalization stages as will be described in more detail later herein.

Figure 2:
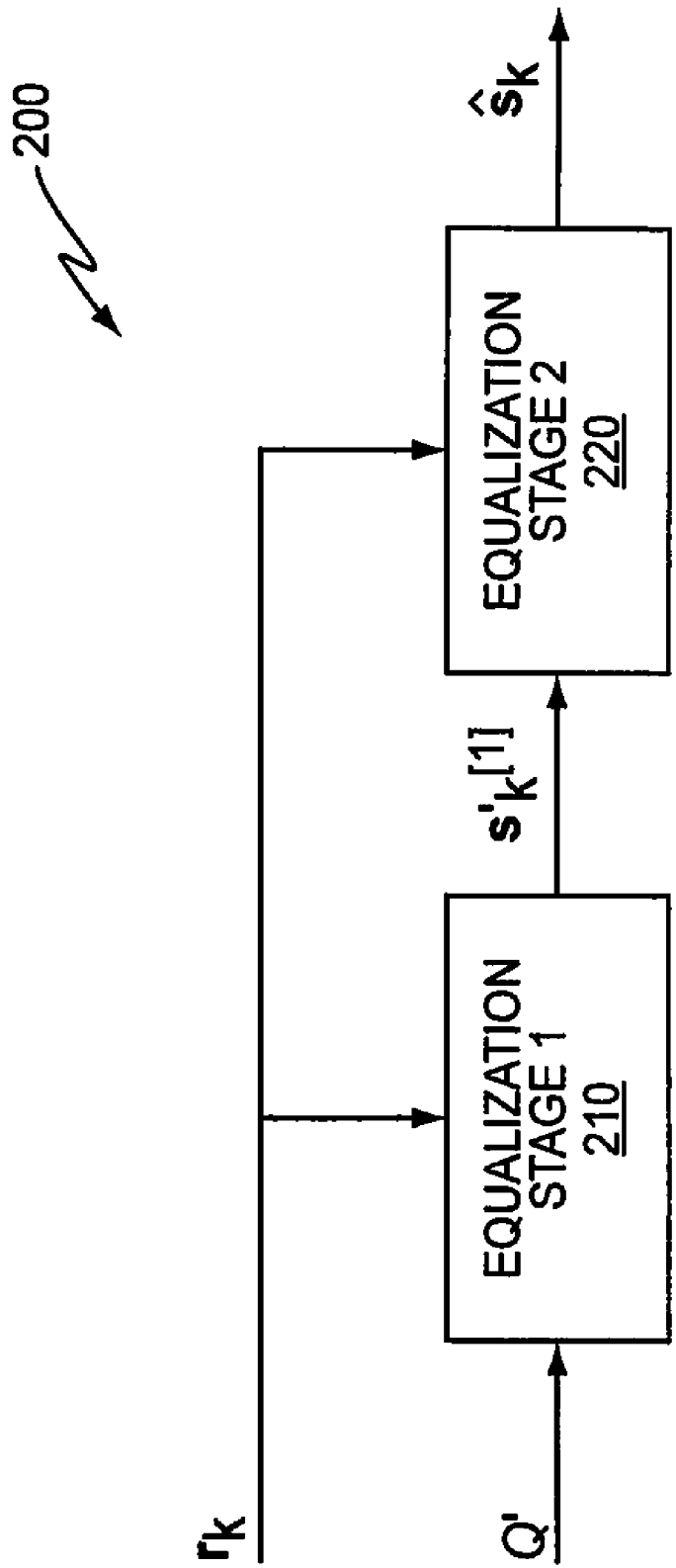
FIG. 2 illustrates a block diagram of an embodiment of a two-stage SLI equalizer.

FIG. 2 illustrates an embodiment of a 2-stage SLI equalization structure 200 included in the receiver 110 of FIG. 1 for suppressing ISI and demodulating a received signal $r_k$. The received signal $r_k$ is carried over the channel 120 and originally modulated at the transmitter 100 using symbol constellation Q. The received signal $r_k$ has ISI and is given by equation (1) above. One skilled in the art can readily expand the signal model represented by equation (1) to other scenarios such as MIMO and multi-code transmission. The originally transmitted signal has symbol constellation Q of size q. The constellation processing module 140 of the receiver 110 groups the points of constellation Q into a plurality of subsets in a way that ensures at least two adjacent subsets overlap. The constellation processing module 140 also determines a centroid-based value for each of the subsets of constellation points and generates an alternative constellation Q' including the centroid-based values, not necessarily belonging to Q, for input to a first stage 210 of the 2-stage SLI equalization structure 200.

The first stage 210 of the SLI structure 200 demodulates the received signal $r_k$ and suppresses ISI using the alternative constellation Q'. That is, the first equalization stage 210 uses the centroid-based values included in Q' as constellation points to perform sequence estimation. Each point in Q' represents a subset of clustered points in Q. In one embodiment, each centroid-based value included in Q' is the actual centroid for the points of a particular subset of Q. In another embodiment, the centroids are approximated as integer values. In yet another embodiment, each centroid-based value included in Q' is the constellation point of Q located closest to the corresponding centroid value. Still other types of values may be used which are derived based on the centroids determined from the different subsets of Q.

The first equalization stage 210 outputs a symbol decision $s_k'^{[1]}$, which belongs to Q'. The second equalization stage 220 accepts $s_k'^{[1]}$ and uses $s_k'^{[1]}$ to choose a localized subset Q" of Q as its own constellation. The decision $s_k'^{[1]}$ output by the first equalization stage 210 can be interpreted to be the representative of Q" in the first equalization stage 210. The second equalization stage 220 outputs the final symbol decision $\hat{s}_k$, which belongs to Q". The final symbol decision $\hat{s}_k$ output by the second stage 220 is determined based on the original received signal $r_k$ and subset Q", which is selected based on the localized symbol decision $s_k'^{[1]}$ output by the first stage 210. In one embodiment, both equalization stages 210, 220 implement MLSE over their respective alphabets, e.g. as previously described herein. Alternatively, the equalization stages 210, 220 implement other types of equalization schemes such as DFSE, DFE, M-algorithm, tree searching, etc.

In one embodiment, the first equalization stage 210 outputs the complete sequence of symbol decisions $s_k'^{[1]}$ in one block, before the second stage 220 begins its operation. In another embodiment, the first equalization stage 210 outputs its symbol decisions $s_k'^{[1]}$ sequentially, based on a decision delay D, as discussed earlier. Then the second stage 220 can begin its operation as it sequentially accepts the symbols from the first stage 210.

The performance of the 2-stage SLI structure 200 of FIG. 2 is primarily limited by that of the first equalization stage 210, which in turn is determined by the choice of subsets. Performance suffers when no adjacent subsets overlap. Consider the case of disjoint subsets. ML (Maximum Likelihood) receivers implicitly define a decision region (Voronoi region) around each constellation point, consisting of received values closest to that point than any other. The decision region boundaries are polyhedrons (made up of sections of hyperplanes). Two constellation points x and y are neighbors if their decision regions touch. The common part is a section of the hyperplane P(x,y) that bisects the space according to x and y. In degenerate cases, the common part can become a line or a point. Now consider two adjacent subsets X and Y of Q which are available to the first equalization stage 210 of the two-stage SLI structure 200. Subsets X and Y have centroids c(X) and c(Y), respectively. Consider neighbor pair (x,y), where x belongs to X and y belongs to Y. Suppose x is transmitted, and the first equalization stage 210 makes an error and chooses subset Y instead of subset X. The effective decision boundary of the first equalization stage 210 is the hyperplane P(c(X),c(Y)). In contrast, ML would make the choice based on P(x,y). For the sake of comparison, ML can be thought of as making an effective decision between X and Y. Then the effective decision boundary is made up of the sections P(x,y) of different nearest neighbor pairs (x,y).

Figure 3:
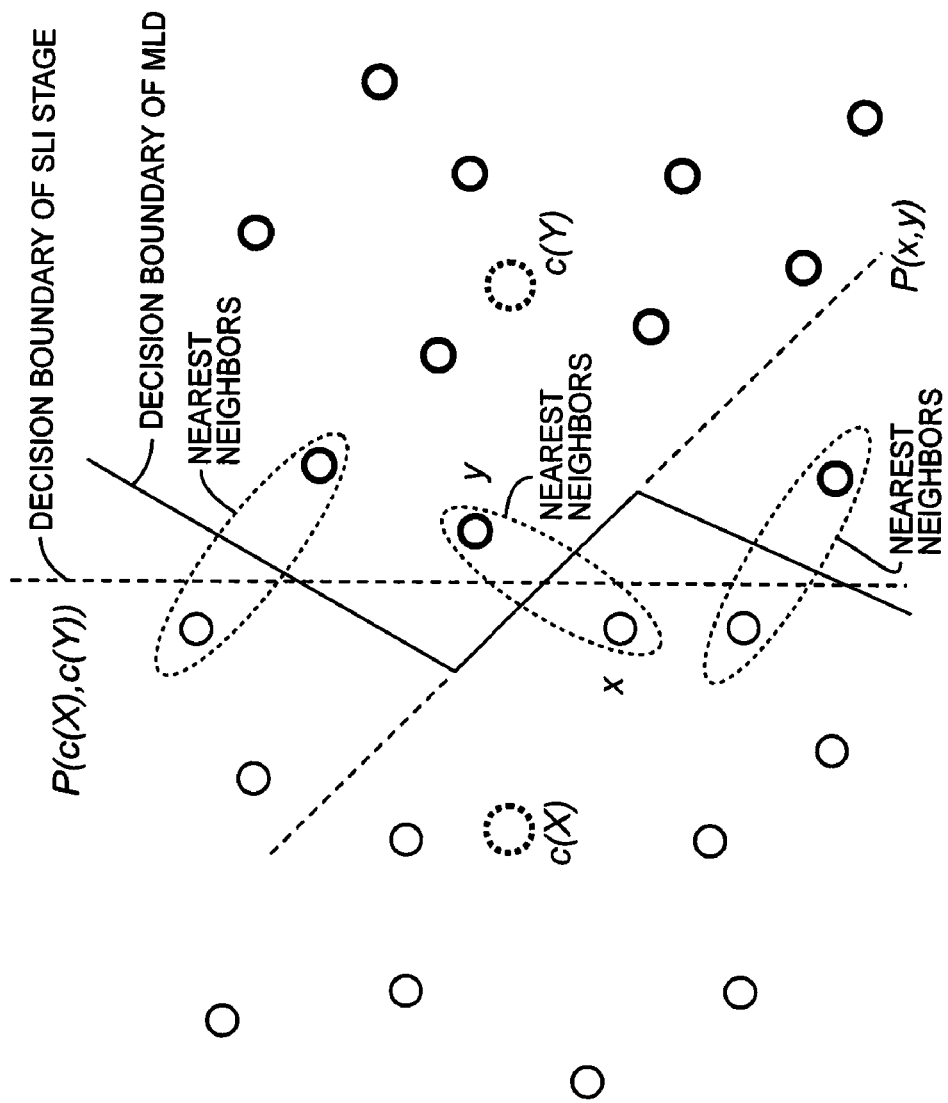
FIG. 3 illustrates a diagram of an embodiment of overlapping constellation subsets for use by a multi-stage SLI equalizer.

FIG. 3 illustrates the effective decision boundary between adjacent subsets X and Y in two dimensions, where the hyperplane becomes a straight line and each constellation point is represented by a circle. In contrast, the decision boundary for ML is a piecewise straight jagged line. The discrepancy between these hypothetical decision boundaries leads to a performance loss in SLI.

Ensuring at least two adjacent subsets have overlap smoothes the decision boundary discrepancy. In particular, in the two stage SLI, including nearest neighbor symbols pairs in the overlap of adjacent subsets of the first demodulation stage means that the first demodulation stage does not have to make a decision about those symbols. That decision will be made in the second stage.

With SLI, the search is further localized from one stage to the next, but the final decision is not made until the last stage. In particular, by making nearest neighbor symbols belong to multiple subsets, a later equalization stage (e.g. second stage 220 in FIG. 2) may recover from an error in an earlier stage (e.g. first stage 210 in FIG. 2). In this context, indecision is beneficial.

Figure 4:
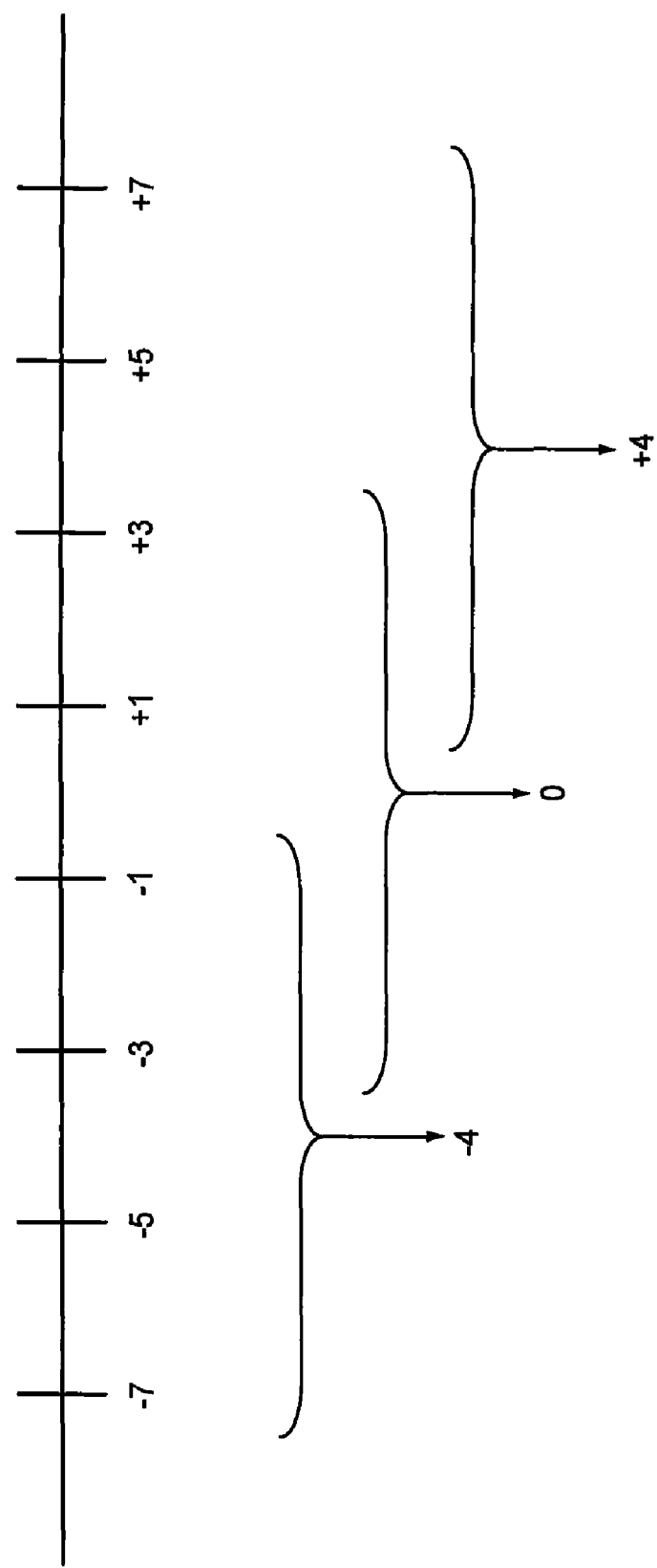
FIG. 4 illustrates a diagram of an embodiment of overlapping ASK constellation subsets for use by a multi-stage SLI equalizer.

FIG. 4 illustrates an exemplary embodiment of an 8-ASK constellation grouped into three subsets. The 8-ASK constellation is given by:

$$Q=\{-7,-5,-3,-1,+1,+3,+5,+7\} \quad (4)$$

The three overlapping subsets shown in FIG. 4 have centroids given by:

$$Q'=\{-4,0,+4\} \quad (5)$$

The overlap means that the second equalization stage 220 of the SLI structure 200 of FIG. 2 can often recover from a bad decision by the first equalization stage 210. The two outer subsets shown in FIG. 4 are offsets of one another, and the offset is equal to the centroid difference. SLI complexity can be further reduced by accounting for the highly structured nature of these subsets. Of course, less structured subsets can also be used with SLI.

Figure 5:
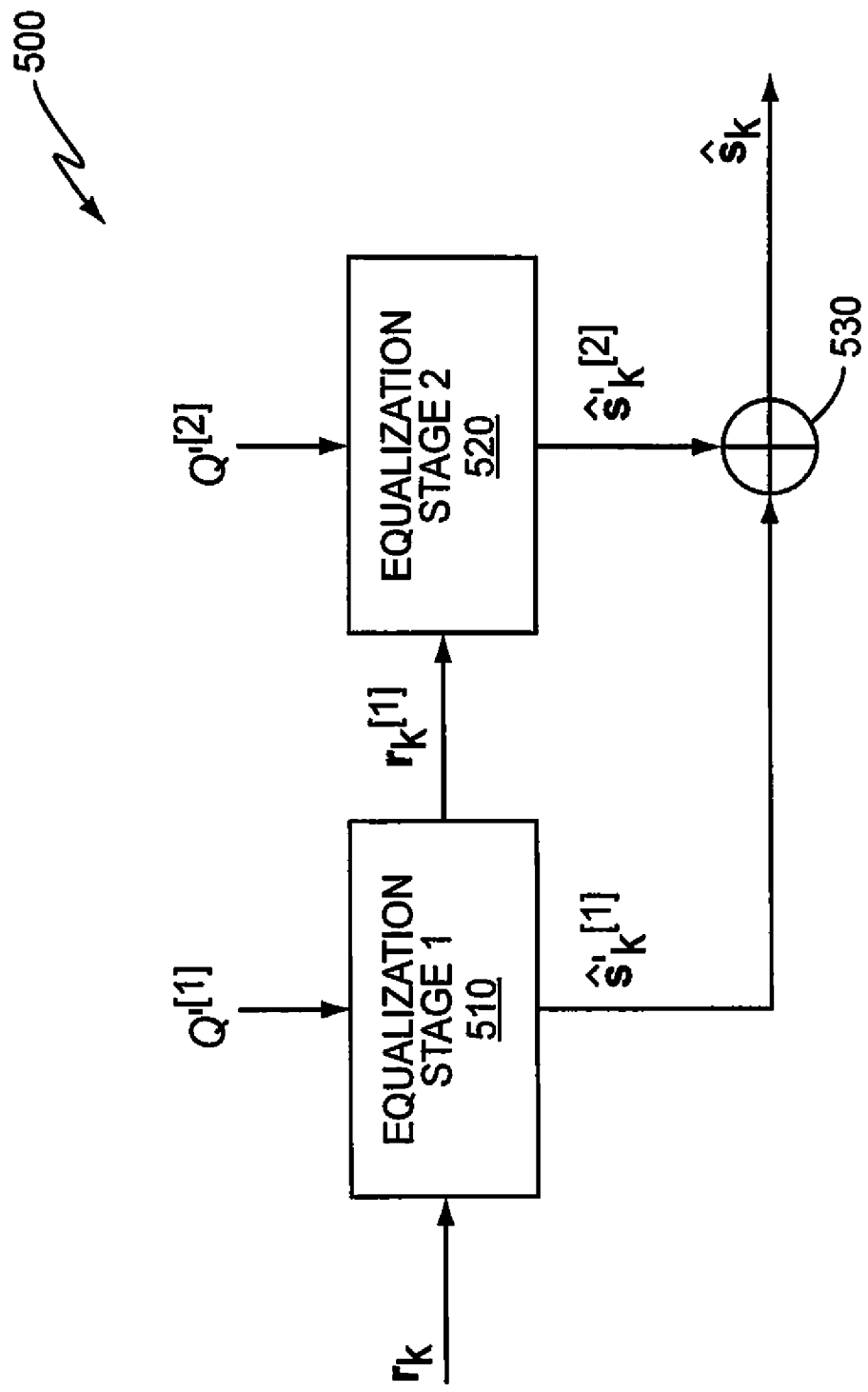
FIG. 5 illustrates a block diagram of another embodiment of a two-stage SLI equalizer.

FIG. 5 illustrates another embodiment of a 2-stage SLI equalization structure 500 for suppressing ISI and demodulating the received signal $r_k$. The 2-stage SLI structure 500 shown in FIG. 5 is similar to the one shown in FIG. 2, except it is tailored to the highly structured nature of the ASK constellation subsets shown in FIG. 4. The constellation input to or selected by the first equalization stage 510 is the set of centroids denoted $Q'^{[1]}$. The first equalization stage 510 outputs a decision $\hat{s}_k'^{[1]}$ which is the centroid-based value included in $Q'^{[1]}$ that most closely corresponds to the signal $r_k$. The first equalization stage 510 also generates a re-modulated signal $\hat{r}_k'^{[1]}$ as a function of $\hat{s}_k'^{[1]}$ and the channel 120 over which the signal is carried as given by:

$$\hat{r}_k'^{[1]} = H_M \hat{s}_{k-M}'^{[1]} + \ldots + H_0 \hat{s}_k'^{[1]} \quad (6)$$

where $H_0$ represents the channel 120 with ISI.

The first equalization stage 510 removes the re-modulated signal $\hat{r}_k'^{[1]}$ from $r_k$ to generate a modified signal $r_k^{[1]}$ for input to the second equalization stage 520 as given by:

$$r_k^{[1]} = r_k - \hat{r}_k'^{[1]} \quad (7)$$

The modified signal $r_k^{[1]}$ is then fed to the second stage 520 instead of the original signal $r_k$. The second equalization stage 520 determines the final symbol decision $\hat{s}_k$ by performing sequence estimation on the signal $r_k^{[1]}$ output by the first stage 510 using the subset $Q'^{[2]}$ of constellation points input to or selected by the last stage 520, generating a localized symbol decision $\hat{s}_k'^{[2]}$ associated with the second stage 520. A summer 530 included in or associated with the second equalization stage 520 sums $\hat{s}_k'^{[1]}$ and $\hat{s}_k'^{[2]}$ to generate the final symbol decision $\hat{s}_k$ as given by:

$$\hat{s}_k = \hat{s}_k'^{[1]} + \hat{s}_k'^{[2]} \quad (8)$$

To account for change to the input of the second equalization stage 520, constellation $Q'^{[2]}$ is the subset of Q centered so its centroid is equal to 0. With regard to the subset embodiment shown in FIG. 4, $Q'^{[2]}$ is the middle subset. The decision $s_k'^{[2]}$ output by the second equalization stage 520 is an element of $Q'^{[2]}$. Considering again an exemplary 8-ASK constellation embodiment, $Q'^{[1]}=\{-4, 0, +4\}$ and $Q'^{[2]}=\{-3, -1, +1, +3\}$. The second subset $Q'^{[2]}$ corresponds to the 4-ASK constellation. The 2-stage SLI embodiments described herein can be readily extended to any number of desired stages.

In this case as well, the first stage may output the complete sequence of symbol decisions in one block, the second stage begins its operation. In another embodiment, the first demodulation stage outputs its symbol decisions sequentially, based on a decision delay D, as discussed earlier. Then the second stage can begin its operation as it sequentially accepts the symbols from the first stage.

Figure 6:
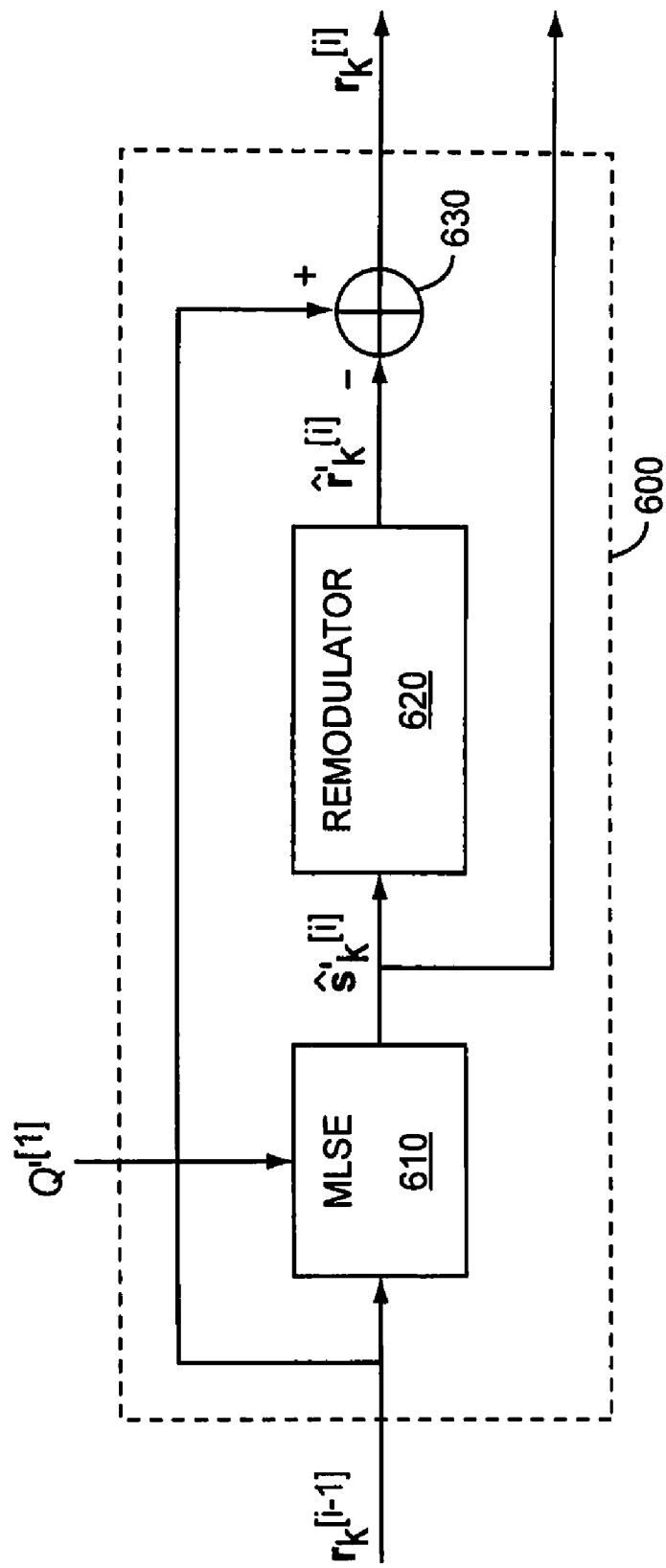
FIG. 6 illustrates a block diagram of an embodiment of an i-th stage of a multi-stage SLI equalizer including an MLSE component.

FIG. 6 illustrates an embodiment of the i-th stage 600 of an N-stage SLI equalizer structure where i<N. In one embodiment, the i-th stage 600 includes an MLSE component 610 which operates over a constellation $Q'^{[i]}$ to suppress ISI. Let $q'^{[i]}$ denote the size of $Q'^{[i]}$. The ISI trellis maintained by the MLSE component derives from $Q'^{[i]}$. Particularly, the ISI trellis has $(q'^{[i]})^M$ states, and $(q'^{[i]})^{M+1}$ branches per stage. Each state has fan-in and fan-out size $q'^{[i]}$. The input to the i-th equalization stage 600 is the modified received signal $r_k^{[i-1]}$ output by the immediately preceding stage (not shown in FIG. 6). The constellation $Q'^{[i]}$ input to the i-th stage 600 includes a set of centroid-based values determined as previously described herein. The MLSE component 610 outputs symbols $\hat{s}_k'^{[i]}$ based on $Q'^{[i]}$ and $r_k^{[i-1]}$. A re-modulator component 620 of the i-th stage 600 generates a re-modulated signal given by:

$$\hat{r}_k'^{[i]} = H_M \hat{s}_{k-M}'^{[i]} + \ldots + H_0 \hat{s}_k'^{[i]} \qquad (9)$$

A signal subtractor component 630 of the i-th stage 600 subtracts $\hat{r}_k'^{[i]}$ from $r_k^{[i-1]}$ to yield a modified received signal $r_k^{[i]}$, which is fed to the next equalization stage (not shown in FIG. 6).

Figure 7:
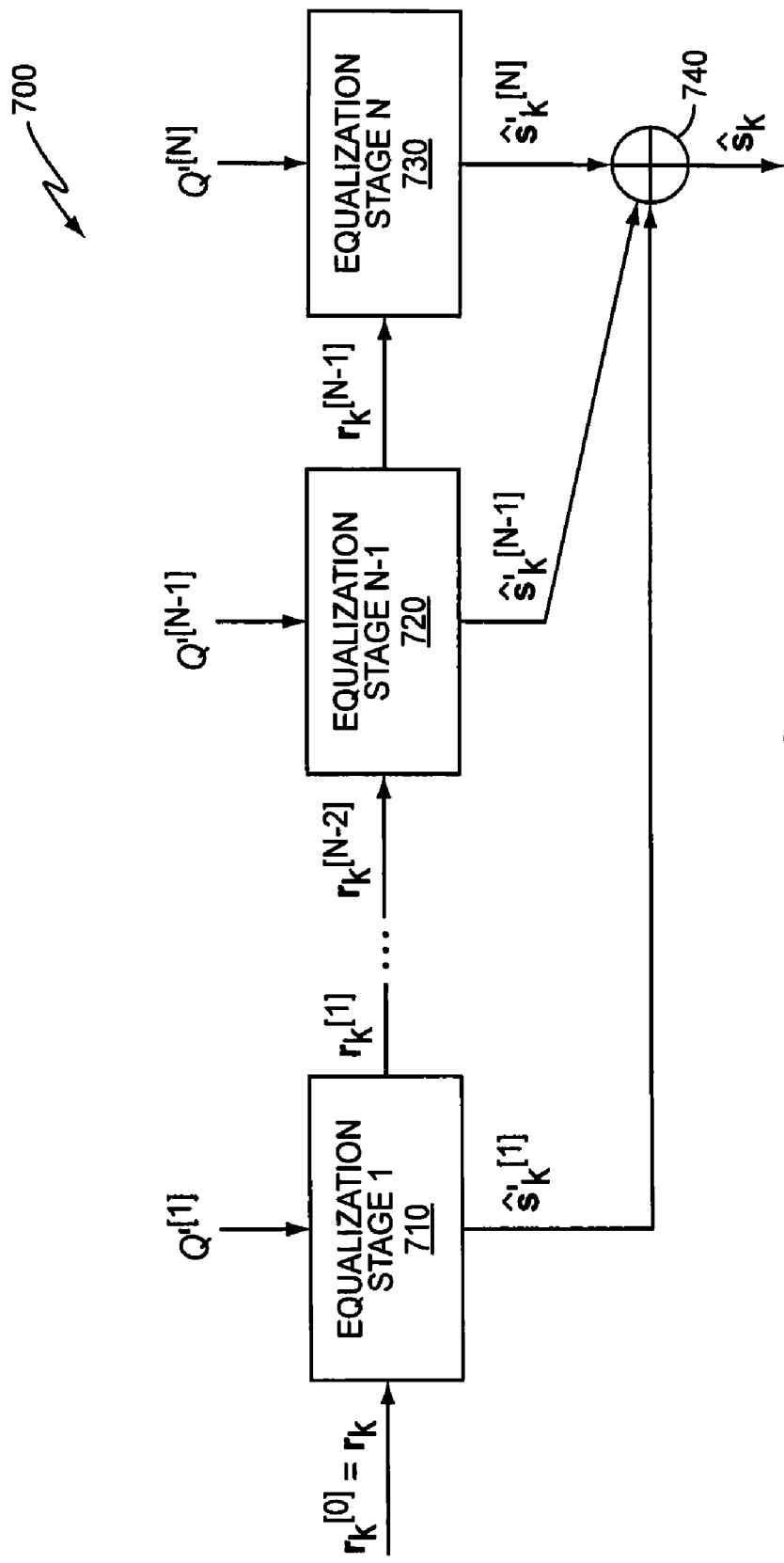
FIG. 7 illustrates a block diagram of an embodiment of an N-stage SLI equalizer.

FIG. 7 illustrates an embodiment of an N-stage SLI equalization structure 700. The input to the first stage 710 is the original received signal $r_k^{[0]} = r_k$. For the last stage 730, the constellation $Q'^{[N]}$ is a subset of Q. There is no need for a re-modulation block in the last stage 730. A summer component 740 included in or associated with the last equalization stage 730 determines the overall final symbol decision by adding all intermediate symbol decisions as given by:

$$\hat{s}_k = \hat{s}_k'^{[1]} + \ldots + \hat{s}_k'^{[N]} \qquad (10)$$

In one embodiment, each intermediary stage 720 of the N-stage SLI equalizer 700 has the same structure as the i-th equalization stage 600 shown in FIG. 6. According to this embodiment, the i-th intermediary stage 720 localizes the search for the final symbol decision $\hat{s}_k$ by demodulating a modified version of the received signal $r_k^{[i-1]}$ output by the immediately preceding stage using the set of centroid-based values $Q'^{[i]}$ input to or selected by the i-th intermediary stage 720 and outputting a localized symbol decision $\hat{s}_k'^{[i]}$ as described previously herein.

The i-th intermediary stage 720 also generates a re-modulated signal $\hat{r}_k'^{[i]}$ as a function of the channel 120 and the localized symbol decision generated by the stage 720. The re-modulated signal $\hat{r}_k'^{[i]}$ is removed from the modified version of the received signal $r_k^{[i-1]}$ output by the immediately preceding stage, e.g. as shown in FIG. 6, to generate a newly modified version of the received signal $r_k^{[i]}$ for input to the stage immediately following the i-th intermediary stage 720. Subtracting $\hat{r}_k'^{[i]}$ removes part of the transmitted signal, which acts as self-interference. This enables later stages to operate with less self-interference. The constellation $Q'^{[i]}$ input to or selected by each of the i intermediary equalization stages 720 includes centroid-based values, which may or may not belong to Q, whereas the constellation $Q'^{[N]}$ input to or selected by the last equalization stage 730 is a subset of Q.

Broadly, there is no restriction on how the overlapping subsets used for SLI equalization are defined. Subset size can vary, the number of available subsets can change from stage to stage, etc. For the case of ASK, overlapping subsets can be defined in a way that yields a nested structure and a three subset representation. Consider the general case of $2^L$ ASK, having the constellation given by:

$$Q = \{-2^L+1, \ldots, -1, +1, \ldots, +2^L-1\} \qquad (11)$$

Three overlapping subsets are defined, where the first subset contains the $2^{L-1}$ negative points. The second includes the $2^{L-1}$ middle points $\{-2^{L-1}+1, \ldots, +^{L-1}-1\}$, corresponding to $2^{L-1}$ ASK. The third subset includes the $2^{L-1}$ positive points. The centroids for each of the three subsets are $-2^{L-1}$, 0 and $+2^{L-1}$, respectively. The same technique can be used to generate three overlapping subsets for $2^{L-1}$ ASK, and so on. An N-stage SLI equalization structure can be designed using these subsets with $N \leq L$. Except for the last stage of the N-stage SLI equalizer, the set of centroids input to or selected by the i-th stage is given by:

$$Q'^{[i]} = \{-2^{N-i}, 0, +2^{N-i}\} \qquad (12)$$

The last stage of the N-stage SLI equalizer has the constellation of $2^{L-N+1}$ ASK. In particular, for N=L-1, $Q'^{[N]} = \{-3, -1, +1, +3\}$. If the maximum number of stages N=L is used, then $Q'^{[N]} = \{-1, +1\}$. The 8-ASK example described above yields a nested subset construction, with L=3 and N=2 stages.

The SLI embodiments described herein can be readily adapted to other modulation schemes such as QAM. The extension of SLI from ASK to QAM is straightforward. Again, in principle, there is no restriction on how the overlapping subsets are defined. In one embodiment, the nested subset design of 2'-ASK can be generalized to $2^{2L}$-QAM. Just as QAM can be viewed as taking the product of two ASK constellations to produce the complex QAM constellation, the product of the ASK subsets can be taken to produce the subsets of QAM.

Figure 8:
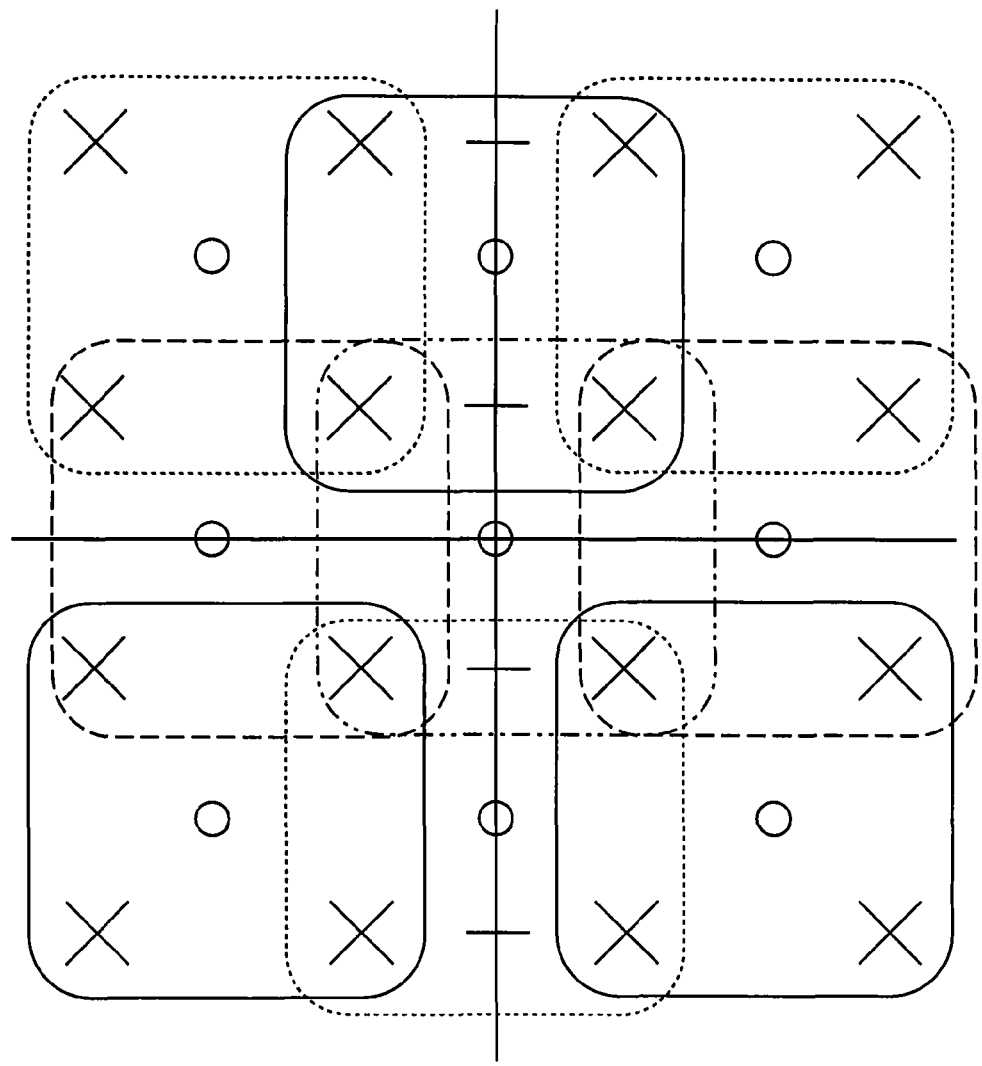
FIG. 8 illustrates a diagram of an embodiment of overlapping QAM constellation subsets for use by a multi-stage SLI equalizer.

FIG. 8 illustrates an embodiment of generalizing ASK to 16-QAM. Each QAM constellation point shown in FIG. 8 is represented by an 'X'. The three subsets for ASK, e.g. as shown in FIG. 4, yield nine subsets for 16-QAM as illustrated by the boxes drawn around different groups of constellation points in FIG. 8. Two or more adjacent subsets have overlapping constellation points. The middle subset coincides with 4-QAM, or QPSK (Quadrature Phase-Shift Keying). The nine centroid values for 16-QAM, which are shown as circles in FIG. 8, are also determined from the respective three centroid values for ASK. ASK can be further generalized to 64-QAM.

Figure 9:
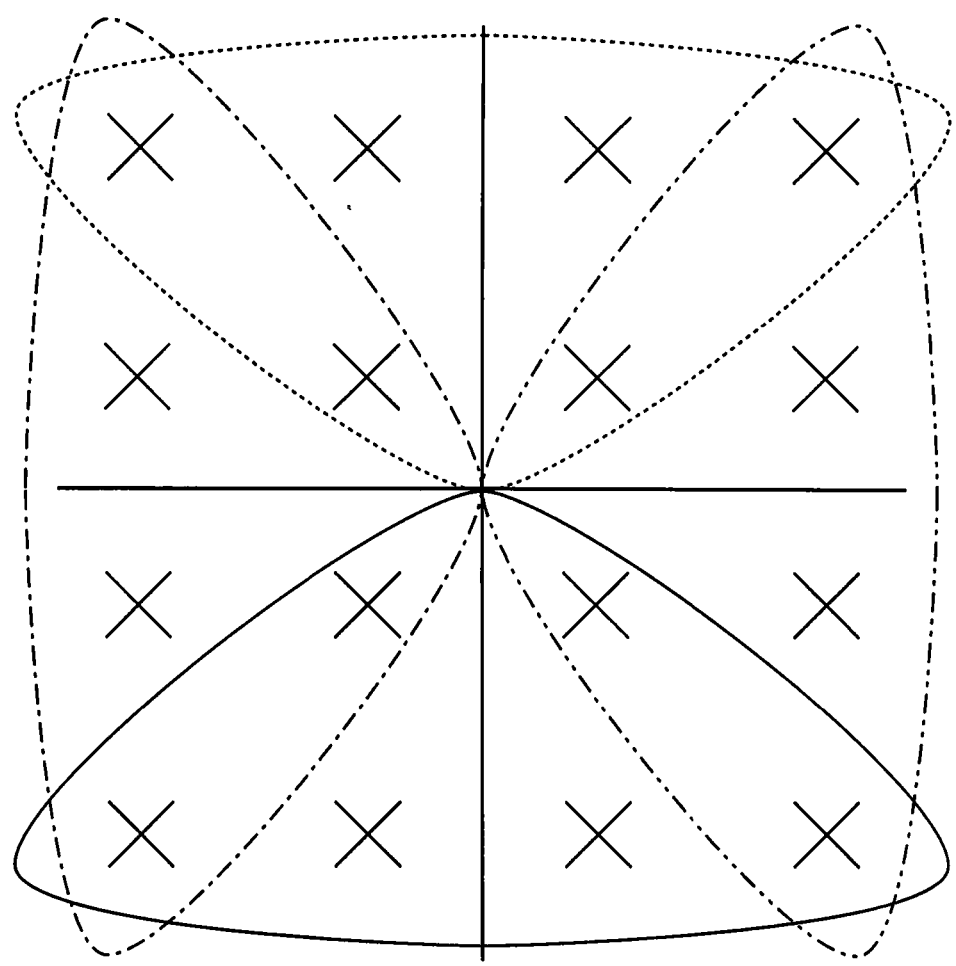
FIG. 9 illustrates a diagram of another embodiment of overlapping QAM constellation subsets for use by a multi-stage SLI equalizer.

The design of overlapping subsets need not be based on the component ASK constellation. FIG. 9 illustrates an embodiment of the 16-QAM constellation where each of the subsets is directly determined from the QAM constellation and not derived from ASK. Each QAM constellation point shown in FIG. 9 is represented by an 'X' and the subsets are shown as boxes drawn around different groups of constellation points. Again, at least two adjacent subsets have overlapping constellation points. Each of the SLI equalization embodiments described herein, including subset selection, yield a low complexity alternative to MLSE with good performance. SLI-based equalization provides a distinct complexity advantage over MLSE as the state space grows, either with the constellation size or with the channel memory.

Storage complexity of MLSE is driven by the number of states, and the computational complexity by the number of branches. The states are referred to next as s and the branches as b. For a conventional MLSE structure, an estimate of complexity is given by:

$$q^M s + q^{M+1} b \quad (13)$$

The complexity of the SLI equalization structures described herein can be estimated by adding the number of states and the number of branches from the multiple stages. This estimate proves to be over-conservative when memory is re-used because the number of states need no be included in the analysis. Regardless, for N-stage SLI-based equalization, the complexity estimate is given by:

$$\sum_{i=1}^{N} (q'^{[i]})^M s + (q'^{[i]})^{M+1} b \quad (14)$$

For 16-QAM, a 2-stage SLI structure may be used based on the ASK-based overlapping subsets derived as previously described herein. Such a 2-stage SLI structure yields $q'^{[1]}=9$ and $q'^{[2]}=4$. For memory M=1, the complexity estimate is then given by:

$$(9s+81b)+(4s+16b)=13s+97b \quad (15)$$

In contrast, conventional MLSE requires 16s+256b. As M grows, the complexity advantage of SLI-based equalization becomes even more evident.

For 64-QAM, either a 2-stage or a 3-stage SLI equalization structure may be used. The 2-stage SLI structure is based on the 8-ASK example previously described herein, with $q'^{[1]}=9$ and $q'^{[2]}=16$. For M=1, the complexity estimate for the 64-QAM 2-stage SLI structure is given by:

$$(9s+81b)+(16s+256b)=25s+337b \quad (16)$$

The 3-stage SLI equalization structure uses a 3-level partition for 64-QAM, with $q'^{[1]}=9$ and $q'^{[2]}=16$. The complexity estimate for the 64-QAM 3-stage SLI structure is given by:

$$2(9s+81b)+(4s+16b)=22s+178b \quad (17)$$

In contrast, conventional MLSE requires 64s+4096b. The complexity advantage of SLI is now evident even for M=1, due to the large constellation size.

The SLI-based equalization structures described herein tend to work more efficiently when the self-interference from lagging channel taps is relatively small. Accordingly, it is useful to combine SLI with a pre-filter, whose job is to push the energy of the channel towards the leading tap(s). Doing so increases the total effective channel memory. However, SLI still provides a large complexity advantage over MLSE, even with the larger memory. A DFSE structure based on SLI, which is discussed later herein, further takes advantage of the pre-filter effect while trimming memory size.

Figure 10:
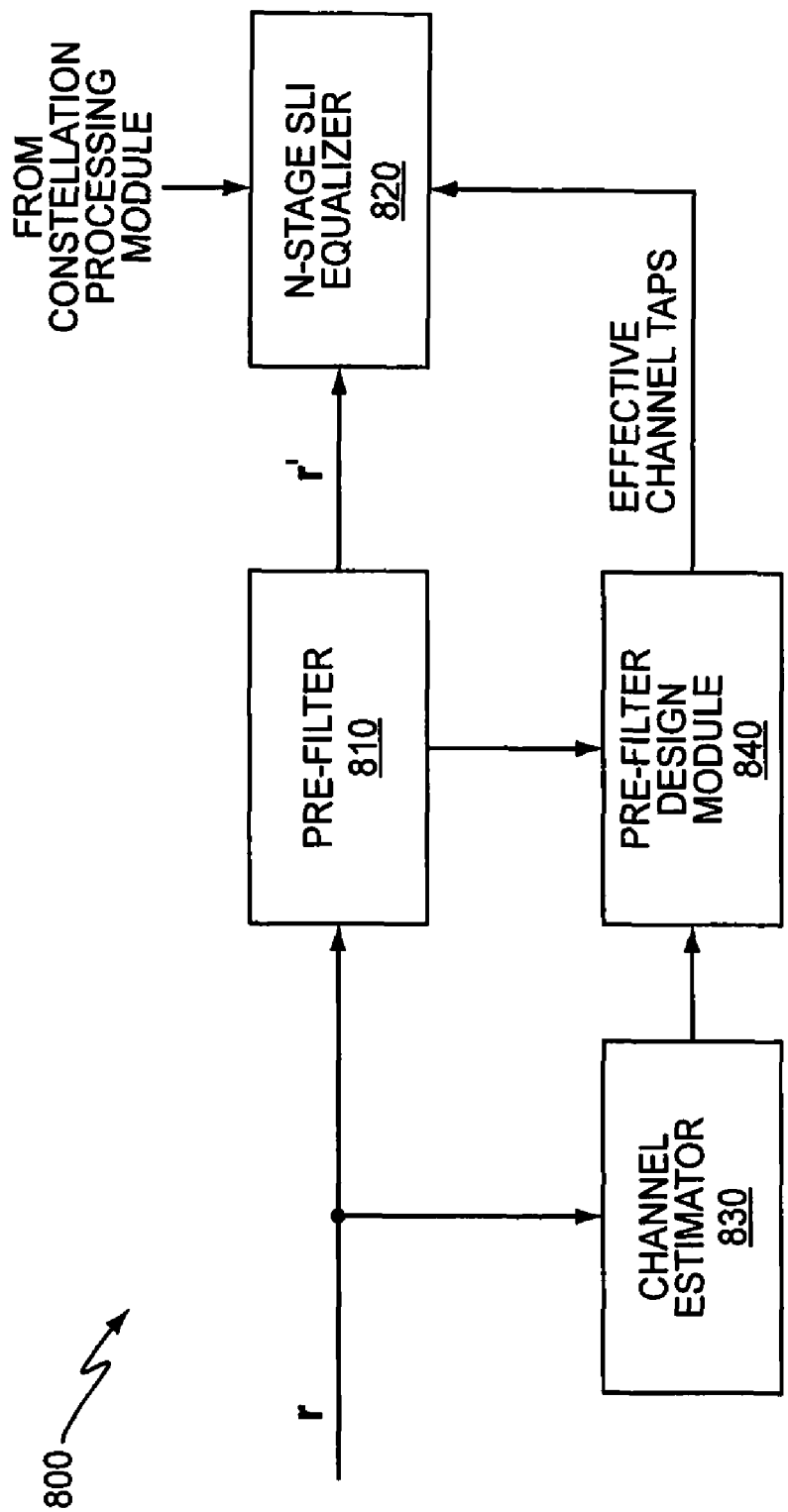
FIG. 10 illustrates a block diagram of an embodiment of an N-stage SLI equalization structure including a pre-filter.

FIG. 10 illustrates an embodiment of an SLI equalizer structure 800 including a pre-filter 810 and an N-stage SLI equalizer 820 of the kind previously described herein. The pre-filter 810 can be designed on the fly, for each realization of the channel response. The effective channel response, as determined by a conventional channel estimator 830, is the convolution of the original channel response and the pre-filter 810, and has a larger memory than the original, but with more of its energy in the leading taps, in particular the first tap. A pre-filter design module 830 determines the pre-filter coefficients so that the pre-filter 810 concentrates the channel energy into the first one or more taps. The filter output r', along with the effective channel tap information, is input to the N-stage SLI equalizer 820 for performing demodulation and ISI suppression as previously described herein. The pre-filter 810 can be flexibly applied to select stages of the N-stage SLI equalizer 820. That is, some stages, in particular early ones, may be empirically or analytically determined to be more sensitive to self-interference from lagging taps, while other stages, in particular later stages, are not. Flexibly applying the pre-filter 810 to particular stages of the SLI equalizer 820 enables more or less complexity and performance to be designed into the SLI equalizer structure 800.

As described previously herein, individual SLI equalization stages may implement MLSE to perform ISI suppression and demodulation. Alternatively, individual SLI equalization stages can implement DFSE or other types of sequence estimation techniques. DFSE is a very effective approximation to MLSE, offering suitable tradeoff between complexity and performance.

Figure 11:
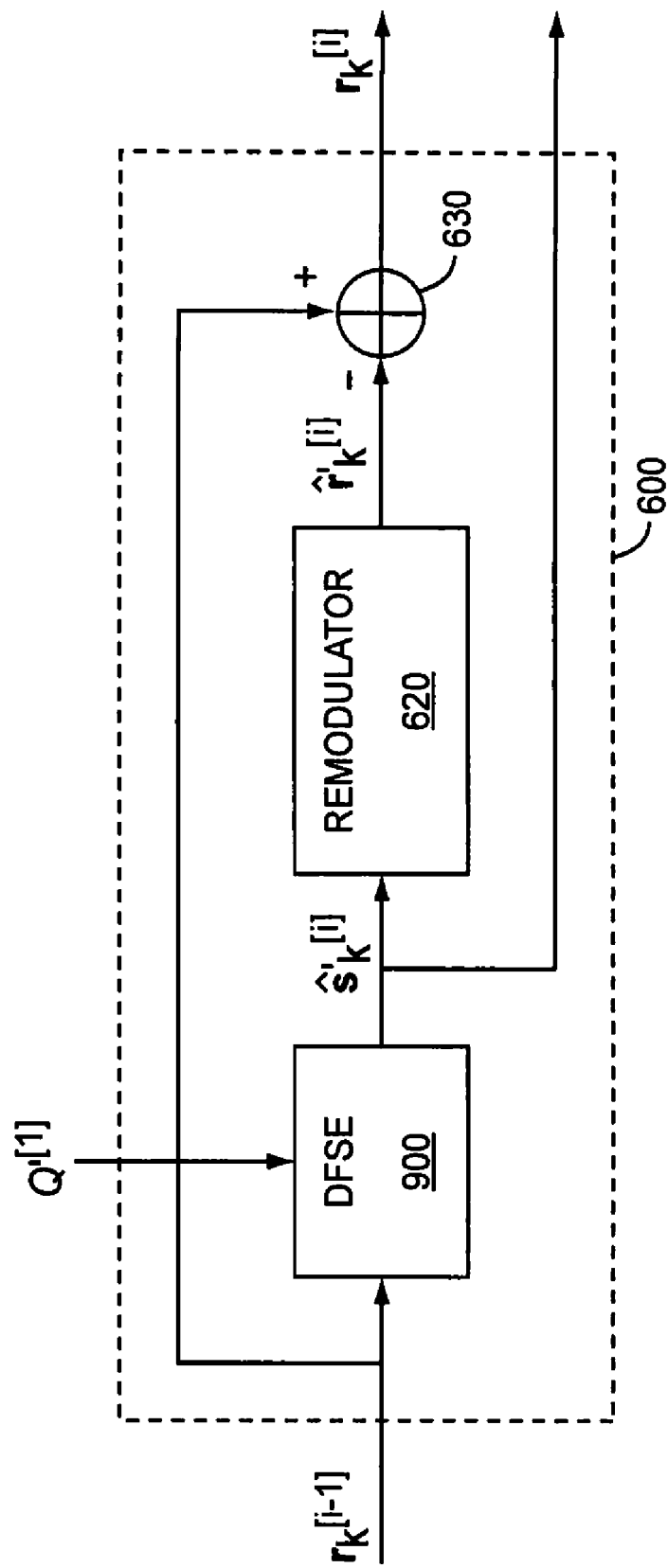
FIG. 11 illustrates a block diagram of an embodiment of an i-th stage of a multi-stage SLI equalizer including a DFSE component.

FIG. 11 illustrates an embodiment where the MLSE component 610 included in the i-th SLI equalization stage 600 of FIG. 6 is replaced with a DFSE component 900. The DFSE memory M'<M is typically a design parameter. The DFSE trellis maintained by the DFSE component 900 is the same as the MLSE trellis, with $q^{M'}$ states. Referring to the MLSE branch metric expression (2), the symbols ($\hat{s}_{k-M}, \ldots, \hat{s}_{k-1}$) represent the previous state as well as the present symbol $\hat{s}_k$ in order to compute the branch metric. With DFSE, the previous state represents only the M' most recent symbols ($\hat{s}_{k-M'}, \ldots, \hat{s}_{k-1}$).

In order to produce the older (M−M') symbols, tentative symbol decisions are made, e.g. as explained earlier with regard to MLSE. That is, the DFSE component 900 traces back from the truncated state ($\hat{s}_{k-M'}, \ldots, \hat{s}_{k-1}$) by following the chain of predecessor states to produce tentative decisions, denoted as ($\bar{s}_{k-M}, \ldots, \bar{s}_{k-M'-1}$). As such, all M symbols are available to compute the branch metric. Since some of the tentative decisions ($\bar{s}_{k-M}, \ldots, \bar{s}_{k-M'-1}$) may be erroneous, it is desirable to mitigate their contribution to the branch metric as much as possible. The pre-filter 810 described above is suitable for this purpose.

With regard to the SLI equalization structures described herein, in a given stage, MLSE can be replaced with DFSE, with or without a pre-filter. This way, DFSE can be flexibly chosen for certain stages, but not others. For instance, a certain stage may have a relatively large effective constellation, and DFSE would help control the complexity of that stage.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of equalizing inter-symbol interference (ISI) in a received signal corresponding to a transmitted signal carried over a channel, comprising:
   grouping points of a constellation associated with the transmitted signal into a plurality of subsets, at least two adjacent ones of the subsets having one or more common constellation points so that the at least two adjacent subsets overlap;
   determining a centroid-based value for each of the subsets of constellation points;
   grouping the centroid-based values into one or more sets for input to an equalizer having a plurality of stages, wherein a first stage of the equalizer localizes the search for a final symbol decision by:

demodulating the received signal using the set of centroid-based values input to the first stage to generate a sequence of symbols output by the first stage;

generating a re-modulated signal associated with the first stage as a function of the sequence of symbols generated by the first stage and the channel over which the transmitted signal is carried;

removing the re-modulated signal associated with the first stage from the transmitted signal to generate a modified signal for input to the stage immediately following the first stage; and equalizing the ISI using the equalizer, each of the stages except for a last one of the stages localizing a search for the final symbol decision using the set of centroid-based values input to or selected by the stage as constellation points and the last stage determining the final symbol decision using the subset of constellation points input to or selected by the last stage, wherein the last stage of the equalizer determines the final symbol decision by:

demodulating a modified version of the received signal output by the stage immediately preceding the last stage using the subset of constellation points input to or selected by the last stage to generate a sequence of symbols associated with the last stage; and summing each of the sequences of symbols generated by the different stages to determine the final symbol decision.

2. The method of claim 1, wherein the equalizer has one or more intervening stages coupled between the first stage and the last stage, each one of the intervening stages localizing the search for the final symbol decision by:

demodulating a modified version of the received signal output by the stage immediately preceding the intervening stage using the set of centroid-based values input to or selected by the intervening stage to generate a sequence of symbols output by the intervening stage;

generating a re-modulated signal associated with the intervening stage as a function of the channel and the sequence of symbols generated by the intervening stage; and removing the re-modulated signal associated with the intervening stage from the modified version of the transmitted signal output by the immediately preceding stage to generate a newly modified version of the transmitted signal for input to the stage immediately following the intervening stage.

3. The method of claim 1, wherein the subset of constellation points input to or selected by the last stage is the subset having a centroid-based value equal to zero.

4. A method of equalizing inter-symbol interference (ISI) in a received signal corresponding to a transmitted signal carried over a channel, comprising:

grouping points of a constellation associated with the transmitted signal into a plurality of subsets, at least two adjacent ones of the subsets having one or more common constellation points so that the at least two adjacent subsets overlap;

determining a centroid-based value for each of the subsets of constellation points;

grouping the centroid-based values into one or more sets for input to an equalizer having a plurality of stages; and equalizing the ISI using the equalizer, each of the stages except for a last one of the stages localizing a search for a final symbol decision using the set of centroid-based values input to or selected by the stage as constellation points and the last stage determining the final symbol decision using the subset of constellation points input to or selected by the last stage, wherein the transmitted signal is modulated with a $2^L$ ASK modulation scheme, the equalizer comprises N of the stages, the set of centroid-based values input to or selected by the ith stage has centroid-based values of $\{-2^{N-i}, 0, +2^{N-i}\}$ and the subset of constellation points input to or selected by the last stage has a constellation of $2^{L-N+1}$ ASK, and wherein a leftmost one of the subsets available for input to or selection by the last stage corresponds to a centermost one of the subsets shifted by a left one of the centroid-based values and a rightmost one of the subsets available for input to or selection by the last stage corresponds to the centermost subset shifted by a right one of the centroid-based values.

5. A method of equalizing inter-symbol interference (ISI) in a received signal corresponding to a transmitted signal carried over a channel, comprising:

grouping points of a constellation associated with the transmitted signal into a plurality of subsets, at least two adjacent ones of the subsets having one or more common constellation points so that the at least two adjacent subsets overlap;

determining a centroid-based value for each of the subsets of constellation points;

grouping the centroid-based values into one or more sets for input to an equalizer having a plurality of stages; and equalizing the ISI using the equalizer, each of the stages except for a last one of the stages localizing a search for a final symbol decision using the set of centroid-based values input to or selected by the stage as constellation points and the last stage determining the final symbol decision using the subset of constellation points input to or selected by the last stage, wherein the transmitted signal is modulated with a QAM scheme, K sets of ASK-based centroids are determined from an ASK modulation scheme and M sets of QAM-based centroids are determined from the K sets of ASK centroids for input to the equalizer as constellation points where $M=K^2$.

6. A receiver, comprising:

a constellation processing module operable to group points of a constellation associated with a transmitted signal into a plurality of subsets, at least two adjacent ones of the subsets having one or more common constellation points so that the at least two adjacent subsets overlap, determine a centroid-based value for each of the subsets of constellation points and group the centroid-based values into one or more sets; and a plurality of equalization stages, each of the equalization stages except for a last one of the equalization stages being operable to localize a search for a final symbol decision using the set of centroid-based values input to or selected by the equalization stage as constellation points and the last equalization stage being operable to determine the final symbol decision using the subset of constellation points input to or selected by the last equalization stage;

wherein a first one of the equalization stages is operable to demodulation a received signal using the set of centroid-based values input to the first equalization stage to generate a sequence of symbols output by the first equalization stage, generate a re-modulated signal associated with the first equalization stage as a function of the sequence of symbols generated by the first equalization stage and a channel over which the transmitted signal is carried, and remove the re-modulated signal associated with the first equalization stage from the received signal to generate a modified signal for input to the stage immediately following the first equalization stage, wherein the last equalization stage is operable to demodulate a modified version of the received signal output by the equalization stage immediately preceding the last equalization stage using the subset of constellation points input to or selected by the last equalization stage to generate a sequence of symbols associated with the last equalization stage, and sum each of the sequences of symbols generated by the different equalization stages to determine the final symbol decision.

7. The receiver of claim 6, wherein the receiver comprises one or more intervening equalization stages coupled between the first and last equalization stages, each one of the intervening equalization stages being operable to demodulate a modified version of the received signal output by the equalization stage immediately preceding the intervening equalization stage using the set of centroid-based values input to or selected by the intervening equalization stage to generate a sequence of symbols output by the intervening equalization stage, generate a re-modulated signal associated with the intervening equalization stage as a function of the channel and the sequence of symbols generated by the intervening equalization stage, and remove the re-modulated signal associated with the intervening equalization stage from the modified version of the received signal output by the immediately preceding equalization stage to generate a newly modified version of the received signal for input to the stage immediately following the intervening stage.

8. The receiver of claim 6, wherein one or more of the equalization stages comprises a maximum likelihood sequence estimator operable to generate the corresponding sequences of symbols.

9. The receiver of claim 6, wherein one or more of the equalization stages comprises a decision-feedback sequence estimator operable to generate the corresponding sequences of symbols.

10. The receiver of claim 6, wherein the subset of constellation points input to or selected by the last equalization stage is the subset having a centroid-based value equal to zero.

11. A receiver, comprising:
a constellation processing module operable to group points of a constellation associated with a transmitted signal into a plurality of subsets, at least two adjacent ones of the subsets having one or more common constellation points so that the at least two adjacent subsets overlap, determine a centroid-based value for each of the subsets of constellation points and group the centroid-based values into one or more sets; and a plurality of equalization stages, each of the equalization stages except for a last one of the equalization stages being operable to localize a search for a final symbol decision using the set of centroid-based values input to or selected by the equalization stage as constellation points and the last equalization stage being operable to determine the final symbol decision using the subset of constellation points input to or selected by the last equalization stage; wherein the transmitted signal is modulated with a $2^L$ ASK modulation scheme, the receiver comprises N of the equalization stages, the set of centroid-based values input to or selected by the ith equalization stage has centroid-based values of $\{-2^{N-i}, 0, +2^{N-i}\}$ and the subset of constellation points input to or selected by the last equalization stage has a constellation of $2^{L-N+1}$ ASK, and wherein a leftmost one of the subsets available for input to or selection by the last equalization stage corresponds to a centermost one of the subsets shifted by a left one of the centroid-based values and a rightmost one of the subsets available for input to or selection by the last equalization stage corresponds to the centermost subset shifted by a right one of the centroid-based values.

12. A receiver, comprising:
a constellation processing module operable to group points of a constellation associated with a transmitted signal into a plurality of subsets, at least two adjacent ones of the subsets having one or more common constellation points so that the at least two adjacent subsets overlap, determine a centroid-based value for each of the subsets of constellation points and group the centroid-based values into one or more sets; and a plurality of equalization stages, each of the equalization stages except for a last one of the equalization stages being operable to localize a search for a final symbol decision using the set of centroid-based values input to or selected by the equalization stage as constellation points and the last equalization stage being operable to determine the final symbol decision using the subset of constellation points input to or selected by the last equalization stage; wherein the transmitted signal is modulated with a QAM scheme and the constellation processing module is operable to determine K sets of ASK-based centroids from an ASK modulation scheme and determine M sets of QAM-based centroids from the K sets of ASK centroids for input to or selection by each of the equalization stages except for the last equalization stage where $M=K^2$.

* * * * *

UNITED STATES PATENT AND TRADEMARK OFFICE
CERTIFICATE OF CORRECTION

PATENT NO. : 8,279,916 B2  
APPLICATION NO. : 12/549143  
DATED : October 2, 2012  
INVENTOR(S) : Khayrallah Page 1 of 1

It is certified that error appears in the above-identified patent and that said Letters Patent is hereby corrected as shown below:

On the Title Page, in Field (57), under "ABSTRACT", in Column 2, Lines 10-11, delete "for a the" and insert -- for the --, therefor.

In Column 1, Line 45, in Equation (1), delete "$V_k$" and insert -- $v_k$ --, therefor.

In Column 8, Line 13, delete "$\{-2^{L-1}+1,...,+^{L-1}-1\},$" and insert -- $\{-2^{L-1}+1,...,+2^{L1}-1\}$, --, therefor.

In Column 8, Line 35, delete "$2'$-ASK" and insert -- $2^L$-ASK --, therefor.

In Column 9, Line 10, delete "need no be" and insert -- need not be --, therefor.

Signed and Sealed this  
Twenty-sixth Day of February, 2013

Teresa Stanek Rea  
*Acting Director of the United States Patent and Trademark Office*